(12) United States Patent
Outland

(10) Patent No.: US 9,410,670 B2
(45) Date of Patent: Aug. 9, 2016

(54) ANIMATED GOBO

(75) Inventor: Breck Outland, Dallas, TX (US)

(73) Assignee: Production Resource Group, LLC, New Windsor, NY (US)

( * ) Notice: Subject to any disclaimer, the term of this patent is extended or adjusted under 35 U.S.C. 154(b) by 751 days.

(21) Appl. No.: 13/602,235

(22) Filed: Sep. 3, 2012

(65) Prior Publication Data
US 2013/0058095 A1 Mar. 7, 2013

Related U.S. Application Data

(60) Provisional application No. 61/530,034, filed on Sep. 1, 2011.

(51) Int. Cl.
*F21S 10/00* (2006.01)
*G03B 21/00* (2006.01)
*G03B 21/20* (2006.01)

(52) U.S. Cl.
CPC ............... *F21S 10/007* (2013.01); *G03B 21/00* (2013.01); *G03B 21/2053* (2013.01)

(58) Field of Classification Search
CPC .... F21S 10/007; G03B 21/00; G03B 21/2053
USPC .................................................. 362/277–284
See application file for complete search history.

(56) References Cited

U.S. PATENT DOCUMENTS 3,408,143 A * 10/1968 Mueller ................... G03H 1/28
352/45
5,282,121 A * 1/1994 Bornhorst ............. F21S 10/007
348/E5.141

FOREIGN PATENT DOCUMENTS

DE 19704660 A1 * 8/1998 ................ B44F 1/10

* cited by examiner

*Primary Examiner* — Anh Mai
*Assistant Examiner* — Nathaniel Lee
(74) *Attorney, Agent, or Firm* — Law Office of Scott C Harris, Inc

(57) ABSTRACT

An automated luminaire, that combines outputs from two different gobo assemblies. A first gobo assembly has a combined sectional frame that is a combination of a plurality of different frames, each frame representing a different individual image. The combined sectional frame includes different optical codings for the different views of the image. A second gobo assembly includes an interference pattern which is coded at different orientations to allow only one of the images to be seen at any of a plurality of different orientations of the interference pattern. At least one of the first and second gobo assemblies being rotatable, and commanded by the commands received by the computer to different orientations relative to one another, to allow the only one of the images to be seen at anyone time.

13 Claims, 3 Drawing Sheets

ANIMATED GOBO

This application claims priority from provisional application number 611530,034, filed Sep. 1, 2011, the entire contents of which are herewith incorporated by reference.

BACKGROUND

In the field of animation, the common practice of conveying movement is accomplished by rapid display of sequential images in order to attain smooth, believable transition between images. This technique is known as frame animation and usually requires 24-30 "frames", or individual images, of movement to achieve a desired animated effect. These frame images are the artistic basis of an animated subject.

Moving lights can also use frame animations as part of their produced effect, e.g., as gobos. For example, the frame animation can be inside a circular or otherwise shaped beam and the frame animation can create the outline/edges of the beam itself.

SUMMARY

The present application describes a gobo that has multiple frame parts included therein, and is animated by selectively interfering those frame parts. The interference pattern can rotate relative to the gobo and partial images can be shown as an animation sequence.

An embodiment describes a gobo set with a first gobo including an image thereon that is a combination of a plurality of different frames, each frame representing a different individual image, and the different frames collectively representing multiple different images, the first gobo including the plurality of different frames all combined into a combined sectional frame, where the combined sectional frame includes different optical codings for the different views of the image; and a second gobo, including an interference pattern, the interference pattern being coded at different orientations to allow one of the images to be seen at any of a plurality of different orientations of the interference pattern.

BRIEF DESCRIPTION OF THE DRAWINGS in the drawings.

DETAILED DESCRIPTION

Figure 1:
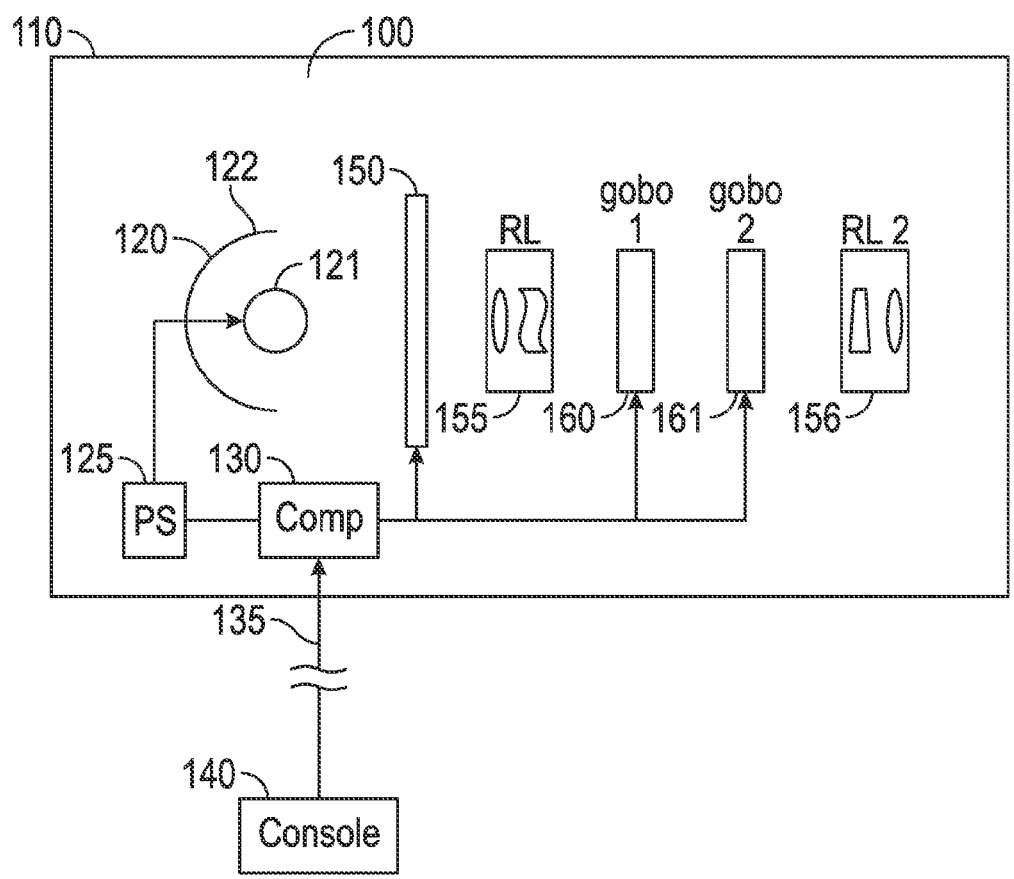
FIG. 1 shows a lighting system.

FIG. 1 shows an embodiment of a luminaire 100 including the techniques described according to the present application. Luminaire 100 includes a housing 110 which holds lighting components therein. A lighting production part 120 includes a light source as lamp 121 and reflector 122. The lamp 121 can be any kind of light source including LED, HID, or the like. Since the luminaire is intended for commercial style projection, preferably the lamp 121 produces an output beam at a level higher than 150 W. The lighting component is driven by a power supply 125, which can be for example a ballast.

Computer device 130 receives computer commands over line 135 from one or more remote consoles 140. The console can be any kind of computer that can create any kind of command for the luminaire. For example, the commands over line 135 can be in DMX-512 format, or in Ethernet packets, or in any other kind of format for controlling an electrically controllable luminaire.

The signals can control the brightness of the lamp 121, and also controls other elements within the luminaire 100.

150 refers to generic color changing and dimming structures, which can be controlled to change colors and/or dim. 150 can also include other conventional items that are within a luminaire, such as cold mirror dichroics, color changers, or any other item that can be within the luminaire 100.

In this embodiment, a relay lens 155, 156 creates two in-focus areas, and two gobos are respectively placed at those in-focus areas. Both the gobo 1 (160) and the gobo 2 (161) are located to be in focus at the same time, to create the effect described herein in an embodiment where two separate gobos are used with a relay lens.

While this describes a specific luminaire 100, the system can be used in other luminaires, for example this can use two gobos that are mounted close to each other as described in our application Ser. No. 12/686,308 to maintain both of these gobos in focus.

At least one gobo is used according to an embodiment for interleaving or combining discrete sections from individual frame animation images for the purpose of creating an animated effect. This effect is projected from the automated luminaire onto scenic elements to create animated and textural effects.

The interleaving of animation frame images is accomplished by sectioning key portions of each static animation frame image and then combining these sectional images in sequence.

Figure 2:
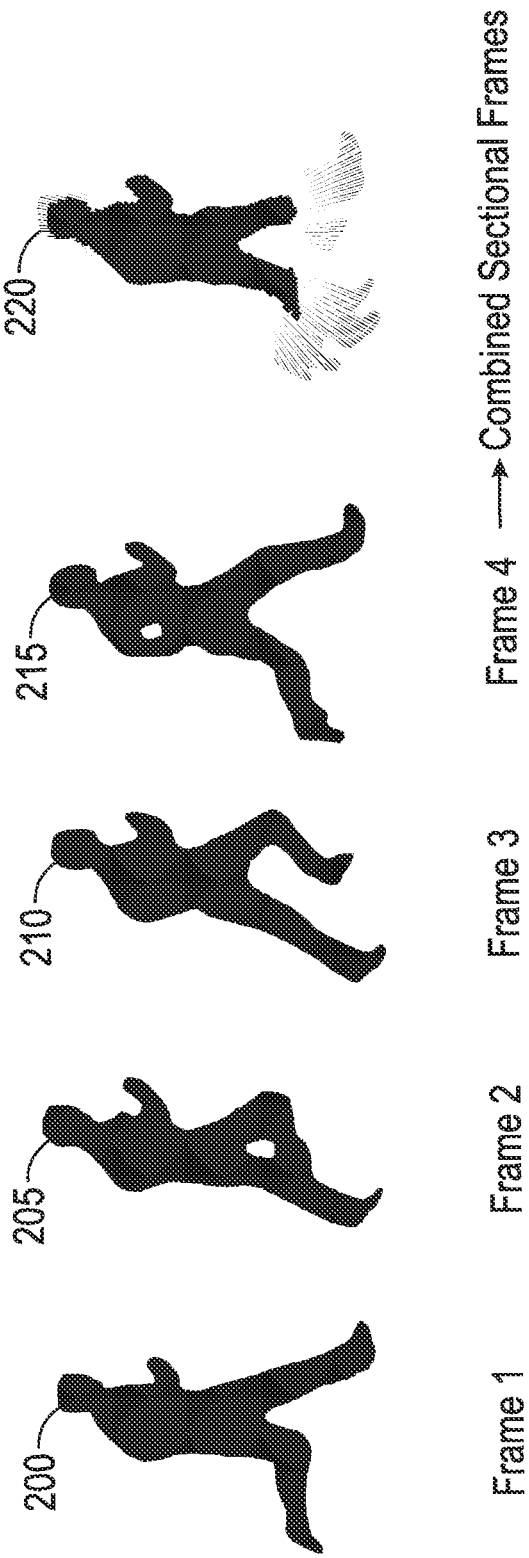
FIG. 2 shows individual frames from a gobo.

FIG. 2 illustrates how frames 1-4 including frame 1 200; frame 2 205; frame 3 210; and frame 4 215 are combined to create a combined sectional frame 220. These sectional images are then used as the first gobo plane 160 in FIG. 1. The different images which are combined together include different optical codings, in the sense that these different optical codings will interfere with or be interfered with differently by an interference pattern. For example, image 1 may be destructively interfered with by a first orientation of interference pattern 1; but might not be destructively interfered with by a second different orientation of that interference pattern 1.

Figure 3:
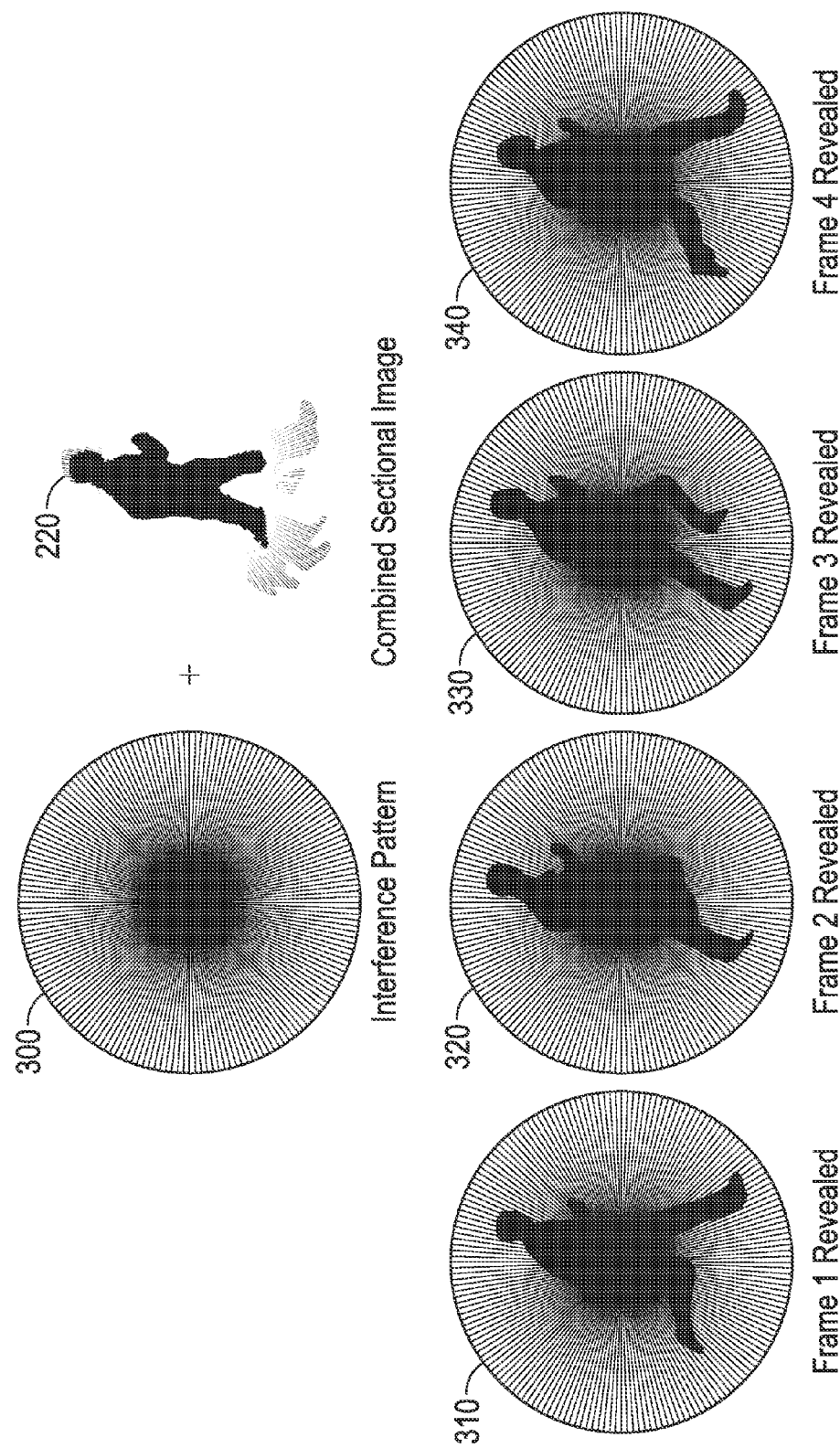
FIG. 3 shows the different frames as they would be revealed.

A second component image shown as 300 in FIG. 3 is used to produce the animated effect. This second gobo forms the second remaining gobo plane. This second image is comprised of an interference pattern which, when rotated or moved with respect to the first combined sectional image 220, reveals one or multiple individual sequential image sections while obscuring other discrete sectional images in the animation sequence. The regular spacing of the opaque interference pattern is constructed in proportion to the combined sectional image to produce the desired animation effect as the interference pattern is moved or rotated. As the interference pattern 300 rotates/translates, there may be more than one partial image revealed in the animation sequence, which due to the nature of its movement and the viewer's perception, appears to create "in between" images by the partial obscuring of one portion of an interleaved image 220 and the simultaneous revealing of the next image. In many locations of the image, one image will be predominantly seen. While other part images may also be seen, the seeing of the different images provides a view of an animation.

In this example, an opaque patterned wheel overlaid upon the first image plane as described in the above discussed application is used.

FIG. 3 shows how the interference pattern 300 can be combined with the combined sectional frame 220 on separate gobos to create a number of different effects depending on the specific rotation of the interference pattern 300. At one rotation, the interference pattern 100 combines to cancel out all or most of the frame portions 205, 210, 215 to leave only frame portion 200 with the backdrop of the interference pattern 300. This is shown as the resultant frame 310 in FIG. 3. Similarly, 320 is shown as the frame 2 only, 330 is shown as the frame 4 only and 340 is shown as the frame 4 only. All these images get the backdrop of the interference frame but show completely or primarily only one of the combined Images.

This opaque image is made or applied to one of two overlapping gobo planes, which are in focus, for example as described in patent application Ser. No. 13/151,124, filed Jun. 1, 2011.

Alternatively, this can use other techniques, for example described in our other patent applications noted above, e.g., where two different gobos are attached on alternate sides of media which are placed close against one another.

The specific contents of the combined sectional frame in interference frame can be determined via trial and error, or can be created via a computer program that creates interference patterns at multiple different angles of the interference pattern 300 that selectively interfere with the combined sectional frame 220.

The system can create multiple different animations in this way using a single set of gobos. For example, the gobo 2 161 can include an interference pattern that can be used with multiple different combined sectional frames on the gobo 1, 160. For example, the gobo 1 160 may have a number of different locations, and each of those different locations can have a different combined sectional frame representing a different animation that can be shown via rotating or moving the interference gobo 161.

In one embodiment, the software running on the computer is operable to create a simulated animation by rotating only one of the two gobos.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other luminaires, other combinations of gobos, and other parts can be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, micro controller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form. This may include laptop or desktop computers, and may also include portable computers, including cell phones, tablets such as the IP ADTM, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A gobo set, comprising:
    a first gobo including an image thereon that is a combination of a plurality of different frames, each frame representing a different individual image, and the different frames collectively representing multiple different images, the first gobo including the plurality of different frames all combined into a combined sectional frame, where the combined sectional frame includes different optical codings for the multiple different images; and
    a second gobo, including an interference pattern, the interference pattern being coded at different rotational orientations at regular spacings that are in proportion to the multiple different images in the first gobo to allow one of the images to be seen at any of a plurality of different rotational orientations of the interference pattern.

2. The gobo set as in claim 1, wherein the first gobo includes multiple different views of the image combined into the combined sectional frame, and the second gobo is moved to reveal predominantly one of the views at each of the plurality of different orientations.

3. The gobo set as in claim 1, wherein the second gobo shows a combination of one frame and at least part of the interference pattern at each of the different positions.

4. The gobo set as in claim 1, wherein the multiple different images are individual frames of an animation, and further comprising an illumination source that illuminates the gobos to display an animation.

5. The gobo set as in claim 4, wherein the first gobo includes multiple different combined sectional frames, each representing a different animation, and further comprising an illumination source that illuminates the gobos to display an animation.

6. The gobo as in claim 1, wherein said first and second gobos are round, and further comprising a moving device that rotates the second gobo through the different orientations to create the animation using the images on the first gobo.

7. Automated luminaire, comprising:
    a light source;
    a computer, receiving commands over a network;
    a first gobo assembly including an image thereon that is a combination of a plurality of different frames, each frame representing a different individual image, and the different frames collectively representing multiple different images, the first gobo including the plurality of different frames all combined into a combined sectional frame, where the combined sectional frame includes different optical codings for the multiple different images; and
    a second gobo assembly, including an interference pattern, the interference pattern being coded at different orientations to allow predominantly one of the images to be seen at any of a plurality of different orientations of the interference pattern; and
    a rotating device that rotates the second gobo assembly through the different orientaions of the interference pattern to display an animation between the different orientaions, said rotating device being commanded by the commands received by the computer to different orientations relative to one another, to cause the predominantly one of the images to be seen at any one time, and to cause the different orientations to be seen in a sequence one after another to form an animation between the different I mean multiple different images of the multiple different orientations.

8. The luminaire as in claim 7, wherein the first gobo includes multiple different views of the image combined into the combined sectional frame, and the second gobo reveals one of the views at each of the plurality of different orientations.

9. The luminaire as in claim 7, wherein the second gobo shows a combination of one frame and at least part of the interference pattern at each of different positions.

10. The luminaire as in claim 7, wherein the multiple different images are individual frames of an animation and further comprising an illumination source that illuminates the gobos to display the animation.

11. The luminaire as in claim 7, wherein the first gobo includes multiple different combined sectional frames, each representing a different animation and further comprising an illumination source that illuminates the gobos to display the animation.

12. The luminaire as in claim 7, wherein the computer runs software that creates the animation by compiling two gobos and rotating only one of the two gobos.

13. The luminaire as in claim 7, further comprising a lens assembly which includes first and second in focus locations which are separate locations that are both simultaneously in focus, and wherein the first gobo is at said first in focus location and the second gobo is at said second in focus location.

* * * * *